Patented Sept. 5, 1939

2,171,978

UNITED STATES PATENT OFFICE 2,171,978

SYSTEM FOR INDICATING THE VALUES OF COMPONENTS OF AN ELECTROMOTIVE FORCE

Wilhelm Geyger, Berlin-Schmargendorf, Germany, assignor to Siemens & Halske, Aktiengesellschaft, Siemensstadt, near Berlin, Germany, a corporation of Germany Application June 26, 1937, Serial No. 150,464
In Germany June 26, 1936

8 Claims. (Cl. 171—95)

My invention relates to an alternating-current compensator with an automatic balancing device.

An alternating-current compensator has been already proposed in which the two components of the voltage to be indicated are directly represented by the deflection of two dynamometers whose field windings are traversed by currents which are 90° out of phase and are taken from that alternating-current source which also supplies the voltage to be indicated. The moving coils of both dynamometers are connected in series with the alternating voltage to be indicated. This known arrangement has the disadvantage that the energy for adjusting the systems must be supplied by the testing circuit. Even in the case of supporting the rotating systems as free of friction as possible, still a fraction of the measuring voltage although low is not compensated for and this fraction is the greater, the smaller the test voltage or the more the supply of energy from the testing circuit is limited. Consequently, the arrangement is only applicable to such cases in which relatively high voltages (about 10 volts) are indicated and in which further the test voltage is not impaired with even a very small supply of energy drawn from the testing circuit. The use of the dynamometers for the direct recording of the compensated values cannot, therefore, be taken by any means into consideration.

The above-mentioned drawbacks of the known arrangement may be removed according to the invention if instead of the dynamometers, induction voltage regulators designed in the form of double coil instruments are employed, one coil of which (compensating coil) supplies the compensating voltage, whereas the second coil (directional coil) is influenced by the output current of an amplifier whose input lies in the compensating circuit. With this arrangement it is possible to use an amplifier without this amplifier having to meet with any special requirements as to the coincidence of phases, invariability of the power amplification ratio etc. and to completely relieve the coils supplying the compensating voltage from the supply of mechanical adjusting energy. Consequently, the compensator according to the invention may also be readily employed for very low voltages, such as 0.01 volt, and further the rotatable part of the two compensating transformers may also be mechanically loaded so that the corresponding position may, for instance, be recorded with the aid of the usual recording devices.

In the accompanying drawing is shown an embodiment of my invention in diagrammatic form.

Figure 1:
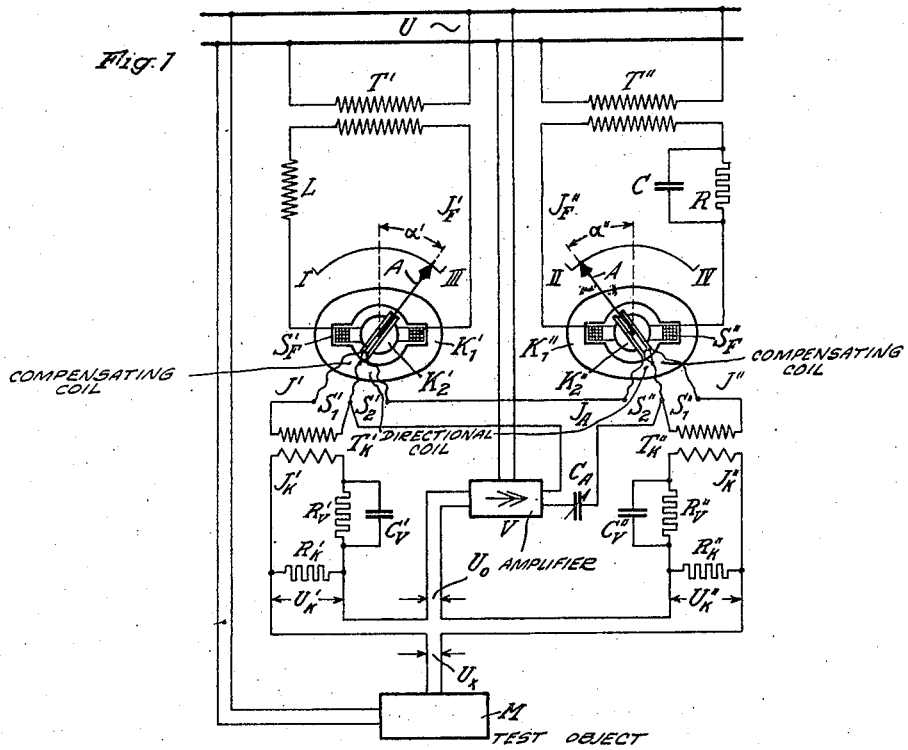
Figure 2:
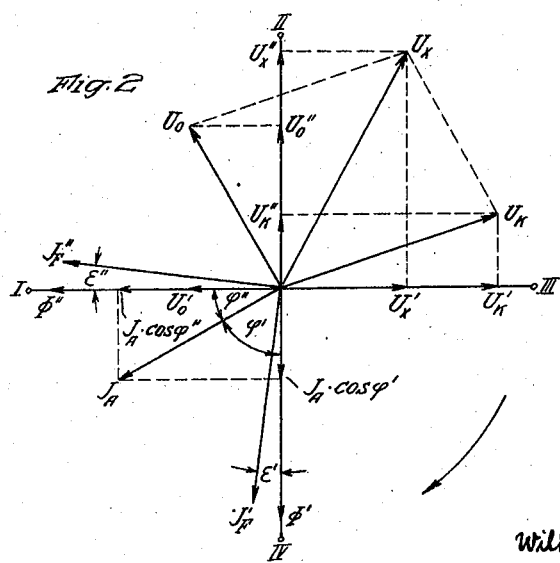

Fig. 1 shows a wiring diagram, whereas Fig. 2 represents a vector diagram showing the electrical processes within a compensator.

$K_1'$ and $K_1''$ designate two iron bodies in whose grooves are arranged exciting windings $S_F'$ and $S_F''$ respectively. Concentrically within the central circular recesses of the iron bodies are disposed two cylindrical iron bodies $K_2'$ and $K_2''$ and within each of the annular gaps formed by the inner and outer iron bodies is rotatably mounted a double coil $S_1'$, $S_2'$ and $S_1''$ and $S_2''$ respectively. Each of these double coils is provided with an indicating element A which may represent for the present purpose any indicating means including a recording hand of any approved construction. The exciting windings $S_F'$ and $S_F''$ are connected to but electrically separated from the supply circuit U by separating transformers T' and T'', from which circuit also the object to be tested is supplied with energy. In one exciting circuit is inserted a self-inductance L and in the other an ohmic resistance R and a capacitor C are connected in parallel relation. These elements are so rated that the exciting currents of the two systems are practically 90° out of phase. $S_1'$ and $S_1''$ designate the compensating coils supplying the compensating voltages and feeding two fixed resistances $R_K'$ and $R_K''$ with energy through transformers $T_K'$ and $T_K''$, the compensating voltages $U_K'$ and $U_K''$ being tapped off from the fixed resistances $R_K'$ and $R_K''$. To each of the circuits including the two resistances $R_K'$ and $R_K''$ is furthermore allotted a parallel system comprising an ohmic resistance $R_V'$ and $R_V''$ and a capacitor $C_V'$ and $C_V''$ respectively so as to bring the compensating voltages $U_K'$ and $U_K''$ to a value corresponding to the purpose under consideration, in other words to adjust at will the indicating range of the compensator. The other two moving coils $S_2'$ and $S_2''$ are connected in series in the output circuit of an amplifier V which is fed with energy directly by the supply circuit U and whose side input is connected in series with the compensating resistances $R_K'$ and $R_K''$ to the test voltage supply $U_x$ taken from the object M to be tested. A capacitor $C_A$ to be hereinafter described is connected in series with the coils $S_2'$ and $S_2''$.

The operation of the above-described arrangement is as follows:

In the compensating coils $S_1'$ and $S_1''$ voltages 90° out of phase are produced, which are proportional to the angles of deflection $\alpha'$ and $\alpha''$. These voltages create through the transformers $T_K'$ and $T_K''$ proportional currents $J_K'$ and $J_K''$ in both circuits $T_K'$, $R_K'$, and $T_K''$, $R_K''$ respectively. These currents in turn produce in the resistances $R_K'$ and $R_K''$ voltage drops $U_K'$ and $U_K''$ proportional to the currents. These voltage drops serve to compensate the test voltage $U_X$. It is self-evident that the voltage at the input circuit of the amplifier will be zero, if a complete compensation is brought about. As long as this is not the case the still existing differential voltage $U_0$ acts on the amplifier so that the coils $S_2'$ and $S_2''$ are traversed by a current. Depending upon which of the two components is not yet completely compensated for, either coil $S_2'$ or $S_2''$, possibly both, will exert a torque so as to bring about a complete balance. By a corresponding selection of the power amplification ratio a practically complete compensation may be brought about even in the case of considerable frictional resistances of the double moving coil. As to the above-described operation the capacitor $C_A$ has no importance at all. However, it is necessary, since through the output circuit of the amplifier both directional coils $S_2'$ and $S_2''$ are so connected that they may influence each other. This undesirable reaction may be counteracted by correspondingly rating the capacitor $C_A$, i. e., the capacitor is modified until with energized field windings $S_F'$ and $S_F''$, but with deenergized amplifier, both double coils come to rest in a desired relative position.

In Fig. 2 is shown the vector diagram of the above-described embodiment of my invention. I to IV designate the coordinate system. $\Phi'$ and $\Phi''$ are the primary fields in the induction voltage regulators produced by the currents $J_F'$ and $J_F''$. Owing to the hysteretic and eddy current losses caused in the iron bodies, the magnetic fluxes are shifted backwards by the phase angles $\epsilon'$ and $\epsilon''$, i. e. in practice by about ½ to 1°. So long as the measuring arrangement is not yet balanced the input voltage $U_0$ is applied to the amplifier; the input voltage is a result of the geometrical difference between the voltage to be tested $$U_X = \sqrt{U_X'^2 + U_X''^2}$$

and the standard voltage $$U_K = \sqrt{U_K'^2 + U_K''^2}$$

and may be dissolved in the two components $U_0' = U_X' - U_K'$ and $U_0'' = U_X'' - U_K''$. In the special case shown in Fig. 2 the phases of the magnetic fluxes $\Phi'$ and $\Phi''$ are so chosen that the phase shifting angle $$(U_0, J_A) = (U_0', \Phi') = (U_0'', \Phi'') = 90°$$

If $\varphi'$ and $\varphi''$ designate the phase angles between $J_A$ and $\Phi'$, and $J_A$ and $\Phi''$, the torques $D'$, $D''$ which act on the moving coils $S_1'$, $S_2'$ and $S_1''$, $S_2''$ result from the equations $$D' = \text{const.} \Phi' \cdot J_A \cos \varphi'$$

and $$D'' = \text{const.} \Phi'' \cdot J_A \cos \varphi''$$

It follows that $D'$ corresponds to the real component $U_0'$ and $D''$ to the imaginary component $U_0''$ referred to the magnitude and direction. The directions of rotation of $S_1'$ and $S_2'$ and $S_1''$ and $S_2''$ are so chosen that the voltages $U_K'$ and $U_K''$ and the angles of deflection $\alpha'$ and $\alpha''$ are varied in accordance with the desired adjustment of compensation. In this case the corresponding torque $D_1$ or $D_2$ is proportional to the corresponding magnitude of $U_0'$ and $U_0''$, that is to say to the corresponding departure from the state of compensation. Hunting of the recording member connected to the moving coils may be prevented by a sufficient, preferably magnetic attenuation. Nevertheless, an adjusting time of about 0.5 second may be attained.

Instead of the artificial connection shown in the above-described embodiment for attaining exciting currents $J_F'$ and $J_F''$ 90° out of phase also other suitable connections may be employed; particularly a rotating field phase advancer may also be employed for this purpose. If these exciting currents $J_F'$ and $J_F''$ are sinusoidal then the fundamental waves of the currents and voltages effective in the measuring arrangement are utilized for the measurement, whereas the harmonic vibrations are not taken into consideration. If a sinusoidal variation of the exciting currents cannot be taken as basis then the selectivity of the fundamental waves desired, as a rule, in the case of alternating-current compensation measurements may be attained by connecting in front of the tube amplifier V a multi-unit filter circuit which keeps away the harmonic vibrations contained in the voltages $U_K'$ and $U_K''$ from the zero indicator formed of the moving coils and the tube amplifier.

The test reading is not influenced by the voltage fluctuations of the power source U, since they vary in the same manner the measuring voltage $U_X$ and the compensating voltages $U_K'$ and $U_K''$. However, the power amplification ratio of the amplifier V is also varied. But since a pure zero method is adopted only the magnitude of the torques $D'$ and $D''$ and, therefore, the adjusting time of the rotatable instrument parts is thereby influenced.

As already above mentioned the compensator according to the invention lends itself also to the amplification of very low voltages or may be used to bring about a full-automatic recording of both components of the test voltage.

The construction of the compensator which is relatively simple may in cases in which the measuring voltage $U_X$ has a given invariable position of phase be still considerably simplified, since there is only one direction of balance to be considered and only one double coil instrument need be provided.

I claim as my invention:

1. In an arrangement for indicating an alternating current voltage taken from an alternating current source, at least one electrodynamic indicating instrument having an exciting winding connected to said source and a pair of movable coils fixed together and located in the field of said exciting winding, one serving as a compensating coil, the other as a directional coil and indicating means connected with said coils, means for adjusting the phase relation of the exciting current with respect to the voltage, and an amplifier including in its input circuit the indicated voltage and the output circuit of said compensating coil, and including said directional coil in its output circuit.

2. In an arrangement for indicating two out-of-phase voltage components of an alternating current source, two electrodynamic indicating instruments, each having an exciting winding connected to said source and each having a pair of movable coils fixed together and located in the field of their appertaining exciting winding, one coil serving as a compensating coil, the other as a directional coil and indicating means connected with each pair of coils, means for adjusting the phase relations of the currents in said exciting windings in accordance with the phase relation of the components to be indicated, and an amplifier including in its input circuit the indicated voltage components and the output circuits of said two compensating coils, and including in its output circuit the two directional coils of said indicating instruments.

3. In an arrangement for indicating two out-of-phase voltage components of an alternating current source, two electrodynamic indicating instruments, each having an exciting winding connected to said source and each having a pair of movable coils fixed together and located in the field of their appertaining exciting winding, one coil serving as a compensating coil, the other as a directional coil and indicating means connected with each pair of coils, means for adjusting the phase relations of the currents in said exciting windings in accordance with the phase relation of the components to be indicated, an amplifier including in its input circuit the indicated voltage components and the output circuits of said two compensating coils, and including in its output circuit the two directional coils of said indicating instruments, and a capacitor for compensating for the reaction of said two directional coils upon one another.

4. In an arrangement for indicating two out-of-phase voltage components of an alternating current source, two electrodynamic indicating instruments, each having an exciting winding connected to said source and each having a pair of movable coils fixed together and located in the field of their appertaining exciting winding, one coil serving as a compensating coil, the other as a directional coil and indicating means connected with each pair of coils, means for adjusting the phase relations of the currents in said exciting windings in accordance with the phase relation of the components to be indicated, a compensating resistance in the output circuit of each compensating coil, and an amplifier including in its input circut the indicated voltage components and the compensating resistances of said compensating coils and including in its output circuit the two directional coils of said indicating instruments.

5. In an arrangement for indicating two out-of-phase voltage components of an alternating current source, two electrodynamic indicating instruments, each having an exciting winding connected to said source and each having a pair of movable coils fixed together and located in the field of their appertaining exciting winding, one coil serving as a compensating coil, the other as a directional coil and indicating means connected with each pair of coils, means for adjusting the phase relations of the currents in said exciting windings in accordance with the phase relation of the components to be indicated, a transformer for each compensating coil, having its primary winding in circuit with its appertaining coil and having a compensating resistance in its secondary circuit, and an amplifier including in its input circuit the indicated voltage components and said compensating resistances of said secondary transformer circuits, and including in its output circuit the two directional coils of said indicating instruments.

6. In an arrangement for indicating two out-of-phase voltage components of an alternating current soruce, two electrodynamic indicating instruments, each having an exciting winding connected to said source and each having a pair of movable coils fixed together and located in the field of their appertaining exciting winding, one coil serving as a compensating coil, the other as a directional coil and indicating means connected with each pair of coils, means for adjusting the phase relations of the currents in said exciting windings in accordance with the phase relation of the components to be indicated, a transformer for each compensating coil, having its primary winding in circuit with its appertaining coil and having in its secondary circuit an ohmic resistance and a capacitor in mutual parallel connection and having a compensating resistance in series with said parallel connected elements, and an amplifier including in its input circuit the indicated voltage components and the compensating resistances of said secondary transformer circuits and including in its output circuit the two directional coils of said indicating instruments.

7. In an arrangement for indicating two out-of-phase voltage components of an alternating current source, two transformers each having its primary winding connected to said source, two electrodynamic indicating instruments, each having an exciting winding connected to the secondary winding of one of said transformers, and each having a pair of movable coils fixed together and located in the field of their appertaining exciting winding, one coil serving as a compensating coil and the other as a directional coil, and indicating means connected with each pair of coils, means for adjusting the phase relations of the currents in said secondary transformer windings in accordance with the phase relation of the components to be indicated, and an amplifier including in its input circuit the indicated voltage components and the output circuits of said two compensating coils, and including in its output circuit the two directional coils of said indicating instruments.

8. In an arrangement for measuring the real and imaginary components of an alternating voltage taken from an alternating current source, two electrodynamic measuring instruments, each having an exciting winding connected to said source and each having a pair of movable coils fixed together and located in the field of their appertaining exciting winding, one coil serving as a compensating coil, the other as a directional coil, and indicating means connected with each pair of coils, means for shifting the currents in the two exciting windings 90° out of phase, and an amplifier including in its input circuit the measured voltage components and the output circuits of said two compensating coils, and including in its output circuit the two directional coils of said indicating instruments.

WILHELM GEYGER.